April 7, 1925.  1,532,781
E. SCHNEIDER
STOPCOCK AND SHUT-OFF COCK FOR PRESSURE FLUID PIPING
Filed June 29, 1923   2 Sheets-Sheet 1

April 7, 1925.

E. SCHNEIDER 1,532,781

STOPCOCK AND SHUT-OFF COCK FOR PRESSURE FLUID PIPING

Filed June 29, 1923 2 Sheets-Sheet 2

Patented Apr. 7, 1925.

1,532,781

UNITED STATES PATENT OFFICE.

EUGÈNE SCHNEIDER, OF PARIS, FRANCE, ASSIGNOR TO SCHNEIDER & CIE., OF PARIS, FRANCE, A LIMITED JOINT STOCK COMPANY OF FRANCE.

STOPCOCK AND SHUT-OFF COCK FOR PRESSURE-FLUID PIPING.

Application filed June 29, 1923. Serial No. 648,556.

*To all whom it may concern:*

Be it known that I, EUGÈNE SCHNEIDER, a citizen of the Republic of France, resident of Paris, France, have invented new and useful Improvements in Stopcocks and Shut-Off Cocks for Pressure-Fluid Piping, which is fully set forth in the following specification.

Ordinary stop cocks and shut-off cocks for pressure fluid piping, and more particularly for piping serving for the conveyance of energy, comprise as is known, a hand-operated or power-operated valve or a spindle so arranged that in its closed position the obturating member receives the pressure upon its lower face, that is to say, upon the face situated below the supporting seat.

With these known constructions, if, for any reason the pressure should occur above the supporting face of the obturating member, considerable leakage is liable to take place along the operating rod of the said member notwithstanding the interposed packings, and this is the case whether the obturating member is or is not pressed down hard upon its seat.

The present invention has for its object to provide an improved stop cock or shut-off cock without these drawbacks which will remain fluid-tight irrespectively of the direction of the flow of the fluid in the piping which it controls.

According to this invention the improved cock comprises an obturating device sub-divided into two elements (valves or spindles) which are arranged in twin fashion and are formed for instance for this purpose on the ends of a cross piece along the middle axis of which the operating member is caused to act. The seat of these two elements are provided on the ends of a duct establishing communication between their upper faces, which duct is at a different level from or out of axis in relation, to the sections of the interrupted discharged duct, so that in the closing position the lower face of one of these sections communicates with the said fluid inlet pipe by way of the union between the communication duct and the corresponding section of the discharge duct, and the lower face of the other section communicates with the said fluid inlet pipe by way of the union between the said communication duct and the other section of the duct.

A constructional example of an improved cock according to this invention is illustrated in the accompanying drawings in which.

In the illustrated example the improved cock comprises a body A in which are formed two casings for the twin elements B, B of an obturating device which is shown as being of the spindle-valve type.

The chambers $b^1$ for the two valves $b^2$, $b^2$ are formed on the ends of a duct $a^3$ establishing communication between them. Seats $b$ are formed at the lower ends of these chambers.

Below one of the seats there terminates a section $a^1$—$a^2$ of a discharge duct serving for instance as the inlet duct. Below the other seat there terminates a duct section $a^4$—$a^5$ serving for instance as the outlet duct.

The fluid-tightness of the valve chambers $b^1$ may be assured by plastic or metal packings $b^3$. These packings are kept tight or in position by means of nuts $b^4$.

The twin arrangement of the two elements of the sub-divided obturating device can be realized in a suitable manner. In the example shown the two spindles B are connected by means of pins $C^1$ to a crossbeam C mounted with a ball and socket joint on an internally screw-threaded operating hand-wheel D. A nut $d^1$ is provided for moving the beam C in the opening movement. The hand-wheel D is supported by a screw E permanently connected to the body A of the cock.

On turning the hand-wheel D in one or the other direction it is caused to ascend or descend along the screw E, thereby carrying along with it by means of the cross beam C and the pins $C^1$, the spindles B so as to open or close the piping.

Whatever may be the direction in which the pressure acts in the duct, this pressure will always act against the undersides of the valves $b^2$, and complete fluid-tightness will always be assured.

Figure 1:
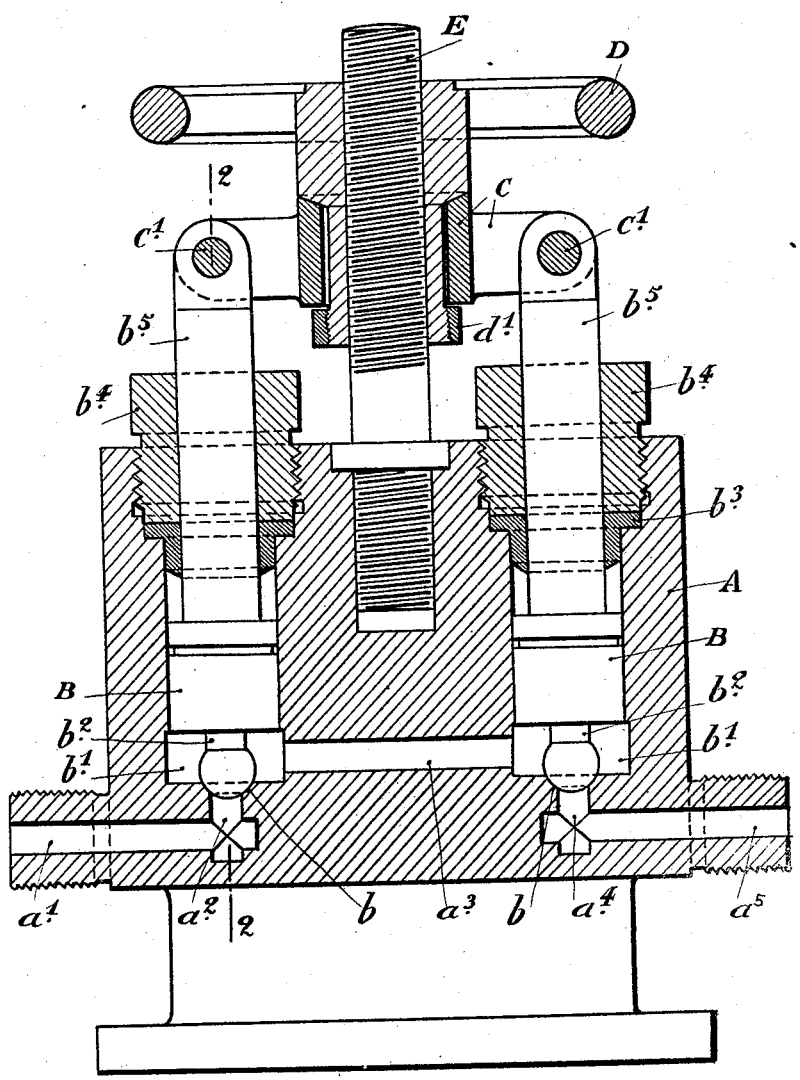
Figure 1 is a longitudinal section of the improved cock taken along the line 1—1 of Figure 2, the twin valves that constitute the obturating device, being shown in their closed position.
Figure 2:
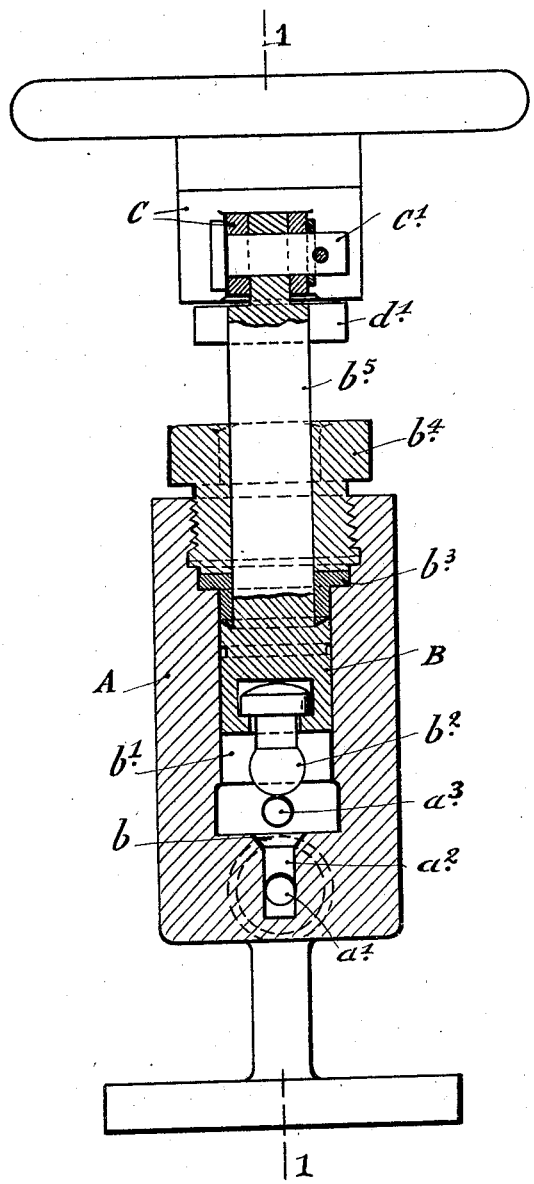
Figure 2 is a cross-section taken along the line 2—2 of Figure 1, the cock being shown open.

The hereinbefore described construction which allows of considerably diminishing the leakage may be improved, according to this invention, by the particular construction of the twin elements. As shown in the drawings the bodies B which serve as supports for the valves $b^2$ $b^2$ are enlarged in relation to the spindles $b^5$ around which the packings $b^3$ are arranged. These enlarged bodies B, at the end of the opening stroke (Fig. 2), compress the packings $b^3$ between the sides of the body A of the cock and the spindles $b^5$.

Having now particularly described and ascertained the nature of my said invention and in what manner the same is to be performed, I declare that what I claim is:—

1. A stopcock for fluid pressure piping comprising a valve casing, valves movably mounted in a pair of chambers formed in said casing, the seats for said valves being formed in said casing adjacent the ends of a communicating duct between said chambers, said duct being in a different plane from the plane of the sections of an interrupted discharge duct formed in said casing and controlled by said valves, and means for simultaneously opening and closing said valves.

2. A stopcock for fluid pressure piping comprising a valve casing having therein an interrupted duct and a pair of communicating chambers, a valve in each of said chambers having a stem projecting exteriorly of said casing, packing for each of said valve stems, and means for actuating said valves.

3. A stopcock for fluid pressure comprising a valve casing having therein an interrupted duct and a plurality of communicating chambers, a valve in each of said chambers for controlling said duct, independent packing for each of said valves, and means for compressing said packing at the end of the opening stroke of said valves.

4. A stopcock for fluid pressure piping comprising a valve casing having therein an interrupted duct and a pair of communicating chambers, a valve in each of said chambers for controlling said duct, the stems of said valves projecting exteriorly of said casing, and means engaging said stems exteriorly of said casing for actuating said valves.

In testimony whereof I have signed this specification.

EUGÈNE SCHNEIDER.

Witnesses:
ANDRÉ MOSTICKER,
LOUIS GARDET.